(12) United States Patent
Hakamata et al.

(10) Patent No.: US 6,703,734 B2
(45) Date of Patent: Mar. 9, 2004

(54) BEARING WITH NONCONTACT SIGNAL TRANSFER MECHANISM

(75) Inventors: Hiroyuki Hakamata, Iwata (JP); Koichi Okada, Iwata (JP)

(73) Assignee: NTN Corporation, Osaka (JP)

( * ) Notice: Subject to any disclaimer, the term of this patent is extended or adjusted under 35 U.S.C. 154(b) by 12 days.

(21) Appl. No.: 09/982,791

(22) Filed: Oct. 22, 2001

(65) Prior Publication Data

US 2002/0050754 A1 May 2, 2002

(30) Foreign Application Priority Data

Oct. 27, 2000 (JP) .................................. 2000-328827

(51) Int. Cl.$^7$ .......................... F16C 19/00; H01F 21/04
(52) U.S. Cl. .................... 310/90; 290/1 R; 310/112; 336/115; 336/123; 384/446
(58) Field of Search ................... 310/112, 90; 384/446, 384/448; 336/115, 122, 123, 130; 290/1 E (56) References Cited

U.S. PATENT DOCUMENTS

| | | | | | |
|---|---|---|---|---|---|
| 4,688,951 | A | * | 8/1987 | Guers | 384/446 |
| 4,958,904 | A | * | 9/1990 | Rawski | 385/26 |
| 5,191,309 | A | * | 3/1993 | Laros | 336/120 |
| 5,200,697 | A | * | 4/1993 | Adler et al. | 324/174 |
| 5,440,184 | A | * | 8/1995 | Samy et al. | 310/90 |
| 5,969,518 | A | * | 10/1999 | Merklein et al. | 324/173 |
| 5,990,675 | A | * | 11/1999 | Merklein et al. | 324/175 |
| 6,161,962 | A | * | 12/2000 | French et al. | 384/459 |
| 6,278,210 | B1 | * | 8/2001 | Fatula et al. | 310/112 |

* cited by examiner

*Primary Examiner*—Burton Mullins
(74) *Attorney, Agent, or Firm*—McDermott, Will & Emery (57) ABSTRACT

A ring magnet is attached to an outer ring by a magnet holding unit. A coil hold unit attached with a generator coil is provided at an inner ring to face the ring magnet. A substrate with a transmission circuit and a loop antenna is attached to the coil hold unit. Rotation of the inner ring causes the generator coil to generate power. The generated power is applied to the transmission circuit. A sensor output or the like is transmitted by the transmission circuit as a weak wave via the loop antenna to be received at the stationary side.

1 Claim, 9 Drawing Sheets

FIG. 1

———————————— (CENTER LINE)

BEARING WITH NONCONTACT SIGNAL TRANSFER MECHANISM

BACKGROUND OF THE INVENTION

1. Field of the Invention

The present invention relates to a bearing with a noncontact signal transfer mechanism. More particularly, the present invention relates to a bearing with a noncontact signal transfer mechanism transmitting a measurement signal, for example, when the physical property such as the temperature of a rotor is measured, to a stationary side in a noncontact manner.

2. Description of the Background Art

In the measuring process of physical property such as the temperature of a shaft supported by a bearing or the like or of a rotor attached to such a shaft, it is necessary to feed power to a sensor and associated electronic circuitry used for the measurement as well as to provide the obtained sensor signal output, a control signal or the like. To this end, slip rings and brushes are employed.

In the case where power is fed and signals are transmitted/received via a contact type brush and slip ring, these components must be exchanged periodically due to the friction of the brush and slip ring. In addition to the wear of the brush, the momentary departure of the brush from the contact surface during rotation will cause electromagnetic noise generation.

When a slip ring is employed, noise will be overlaid on the signal to prevent accurate measurement. A weak signal cannot be transmitted/received. Furthermore, the spin finishing process is required when the brush and slip ring are attached. The ring must be attached accurately to prevent the departure of the brush.

SUMMARY OF THE INVENTION

In view of the foregoing, a main object of the present invention is to provide a bearing with a noncontant signal transfer mechanism that can transfer a signal in a noncontact manner without using a contact type brush and slip ring, or the like.

According to an aspect of the present invention, a bearing with a noncontact signal transfer mechanism transmitting a signal from a rotary shaft to a fixed shaft includes a power generation circuit generating power between the fixed shaft and the rotary shaft, and a signal transfer circuit transmitting a signal from the rotary shaft to the fixed shaft in a noncontact manner based on the power generated at the power generation circuit.

Since a signal can be transferred in a noncontact manner, the present invention is immune to the wear, noise generation, and attachment accuracy in the case where a brush and slip ring are employed.

The power generation circuit includes an annular permanent magnet provided at the fixed shaft, and a generator coil provided at the rotary shaft, generating power by rotating along the annular permanent magnet.

The power generation circuit includes a power feed coil wound around a yoke provided at the fixed shaft, and a power receiving coil wound around a yoke provided at the rotary shaft. A magnetic path is formed between the yoke of the fixed shaft and the yoke of the rotary shaft to output a current flow to the power receiving coil.

The signal transfer circuit includes a transmission coil wound around the yoke of the rotary shaft to transmit a signal, and a reception coil wound around the yoke of the fixed shaft. A magnetic path is formed between the yoke of the rotary shaft and the yoke of the fixed shaft to provide a signal corresponding to the signal flowing to the transmission coil to the reception coil.

The signal transfer circuit includes a transmission coil wound around the yoke of the rotary shaft to transmit a signal, and a magnetic detector element provided at the fixed shaft facing the transmission coil to detect change in the magnetic force of the transmission coil.

The signal transmission circuit also includes a light emitting element provided at the rotary shaft to emitt light according to a signal, and a light receiving element provided at the fixed shaft facing the light emitting element to receive light from the light emitting element.

The signal transfer circuit further includes a transmission circuit provided at the rotary shaft to transmit a signal through radio, and a reception circuit provided at the fixed shaft to receive a signal transmitted from the transmission circuit through radio.

The fixed shaft is an outer ring whereas the rotary shaft is an inner ring. A rolling element is provided between the outer ring and the inner ring.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
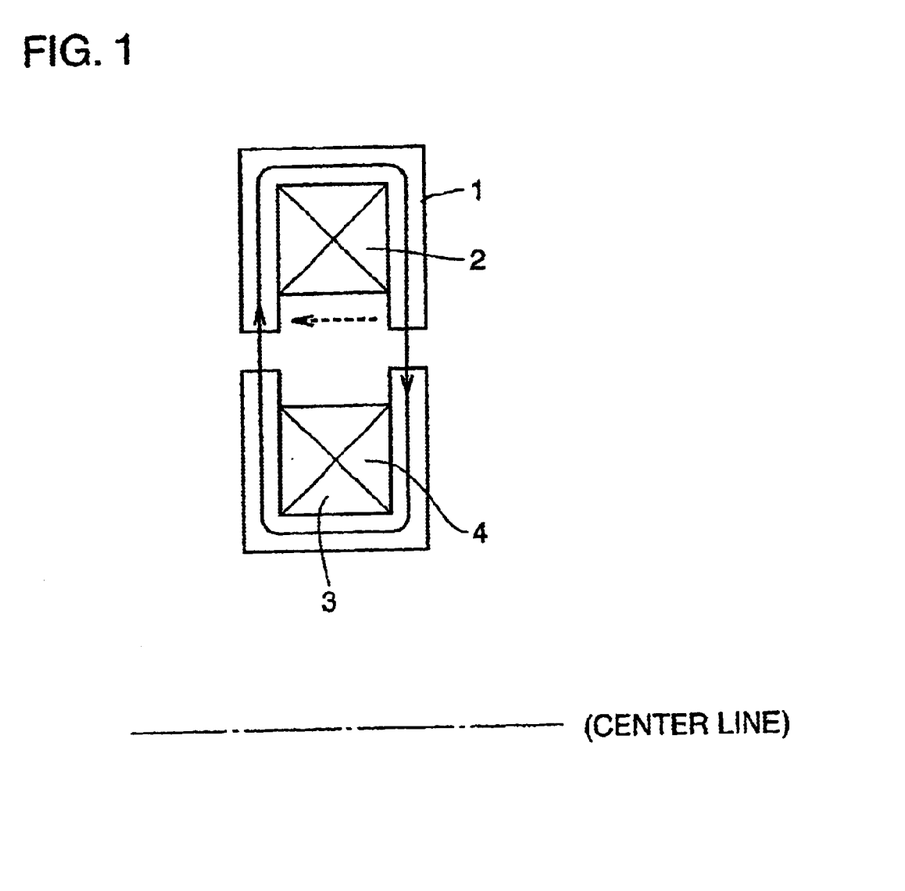
FIG. 1 is a diagram to describe the principle of feeding power through magnetic coupling according to the present invention.

FIG. 1 is a diagram to describe the principle of power feeding through magnetic coupling according to the present invention, corresponding to a cross section in the radial direction of an annular power feed yoke 1 and a power receiving yoke 3. The lower side of the center line is not depicted.

Referring to FIG. 1, power feed yoke 1 and power receiving yoke 3 are formed in an annular manner. Power feed yoke 1 is arranged at the outer side and power receiving yoke 3 is arranged at the inner side. Respective open ends face each other radially with a constant distance therebetween. A power feed coil 2 is wound around power feed yoke 1. A power receiving coil 4 is wound around power receiving yoke 3. Conduction of a current to power feed coil 2 forms a magnetic path from power feed yoke 1 via power receiving yoke 3 in the direction indicated by the arrow in FIG. 1. A current is conducted to power receiving coil 4 by the crossing of the magnetic field generated by power receiving yoke 3 with power receiving coil 4.

When the distance between power feed yoke 1 and power receiving yoke 3 is longer than the distance between the open ends of power feed yoke 1, a magnetic path is formed across power feed yoke 1 as indicated by the dotted line arrow of FIG. 1. However, if the distance between power feed yoke 1 and power receiving yoke 3 is small, the magnetic field will pass through power feed yoke 1 and power receiving yoke 3 since the magnetic resistance is smaller via power receiving yoke 3.

Since the yokes face each other all over along the circumferential surface in FIG. 1, the gap between the two yokes, even if the yokes are not disposed completely concentrically and is eccentric, is averaged so that the amount of power feed will not vary.

By conducting an alternating current to power feed coil 2 in FIG. 1, an alternating current is induced at power receiving coil 4. This induced current can be used as the direct current source by rectifying the induced current.

Figure 2A:
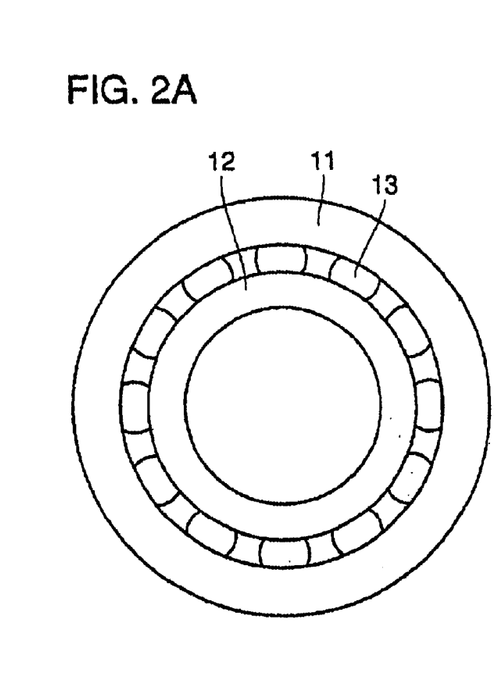
FIGS. 2A–2C show an embodiment of a bearing with a noncontact signal transfer mechanism of the present invention.
Figure 2B:
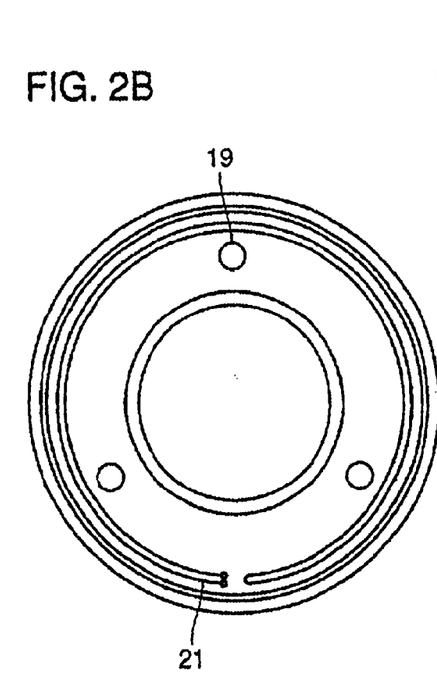
Figure 2C:
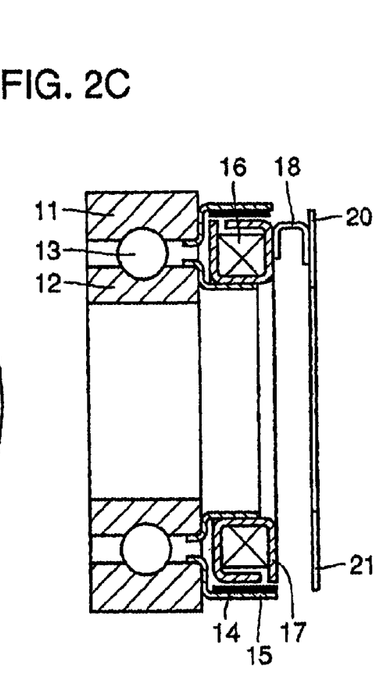

FIGS. 2A–2C show a noncontact type slip ring corresponding to a combination of a rotary generator and a weak radio transmitter according to an embodiment of the present invention. FIGS. 2A, 2B and 2C are a left side view, right side view, and vertical cross sectional view, respectively, of the noncontact slip ring.

Referring to FIG. 2A, a ball 13 is inserted as a rolling element between an outer ring 11 and an inner ring 12 to form a conventionally-known ball bearing. Outer ring 11 is fixed, i.e., stationary. A magnetic hold unit 15 attached with a ring magnet 14 at the inner side is provided at outer ring 11, as shown in FIG. 2C.

A coil hold unit 17 with a generator coil 16 wound is attached to inner ring 12 so as to face ring magnet 14. An attachment 18 is provided at three locations at coil hold unit 17. A substrate 20 is attached to attachment 18 by a fixture screw 19, as shown in FIG. 2B. Substrate 20 has the components of a transmission circuit attached at the generator coil 16 side and a loop antenna 21 attached at the opposite side.

When the inner ring 12 is turned round by some means, generator coil 16 crosses the magnetic field of ring magnet 14 to generate power. The generated power is supplied to the transmission circuit. A weak wave is transmitted from loop antenna 21.

According to the present embodiment, the bearing with a noncontact signal transfer mechanism can transmit a detection signal at the rotating portion by a weak radio signal while generating power without having to use mechanical components such as the contact type brush and slip ring. The conventional problems can be solved.

Figure 3:
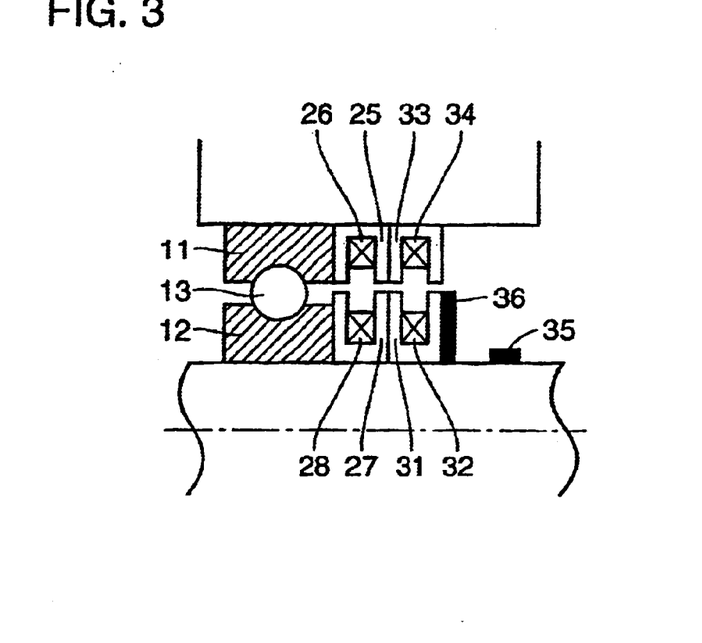
FIG. 3 shows the main part of another embodiment of the present invention based on the principle of FIG. 1.

FIG. 3 is a cross sectional view of the main part of the outer ring and inner ring according to another embodiment of the present invention, employing the principle of FIG. 1. Referring to FIG. 3, a power feed coil 26 wound around a power feed yoke 25 and a reception coil 34 wound around a reception yoke 33 are arranged adjacent to each other at outer ring 11. A power receiving coil 28 wound around a power receiving yoke 27 and a transmission coil 32 wound around a transmission yoke 31 are arranged adjacent to each other at inner ring 12. Power receiving coil 28 and transmission coil 32 face power feed coil 26 and reception coil 34, respectively, in the axial direction.

A sensor 35 and an electronic circuit 36 are provided at inner ring 12. Sensor 35 detects a physical property such as the temperature of a rotor. Electronic circuit 36 includes an amplifier and the like to drive transmission coil 32 according to the output of sensor 35 and delivers a detection signal towards reception coil 34 based on the principle of FIG. 1.

Conduction of an alternating current to power feed coil 26 induces an alternating current to power receiving coil 28 even if the rotary shaft is in a stationary state. By providing a rectifying circuit in electronic circuit 36, a rectified direct current can be supplied to the amplifier and the like of electronic circuit 36. Therefore, power can be supplied independent of the number of revolutions.

Figure 4:
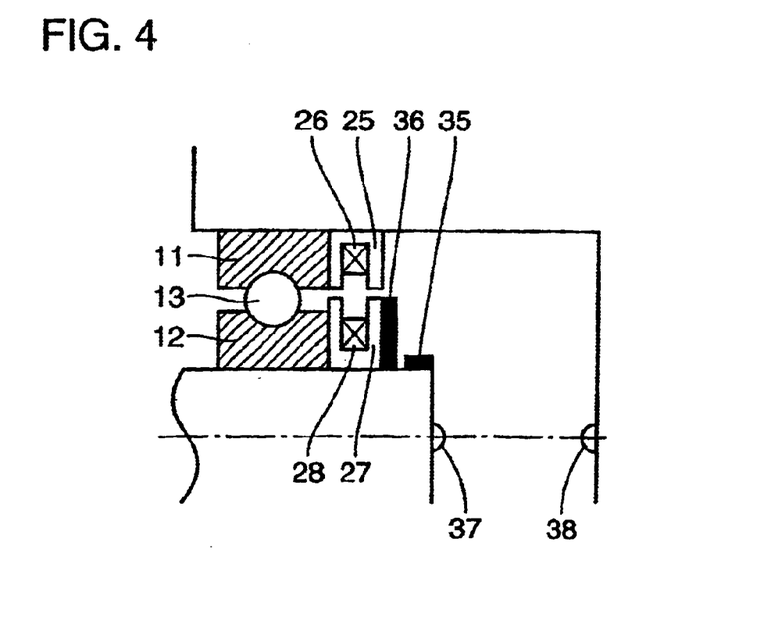
FIGS. 4 and 5 show further embodiments of the present invention based on the principle of FIG. 1.

FIG. 4 is a sectional view of the main part of the outer ring and inner ring according to a further embodiment of the present invention based on the principle of FIG. 1. The device of FIG. 4 has a transmission LED (Light Emitting Diode) 37 and a reception PD (Photo Diode) 38 provided instead of transmission coil 32 and reception coil 34 shown in FIG. 3. Transmission LED 37 is provided at the rotor side whereas reception PD 38 is provided at the stationary side. When transmission LED 37 and reception PD 38 face each other, electronic circuit 36 causes transmission LED 37 to emit light based on the output of sensor 35. The emitted light is received by PD 38, whereby a detection signal is transferred. By forming a signal transfer circuit with transmission LED 37 and reception PD 38, a signal can be delivered with power lower than that required to drive the coil.

Figure 5:
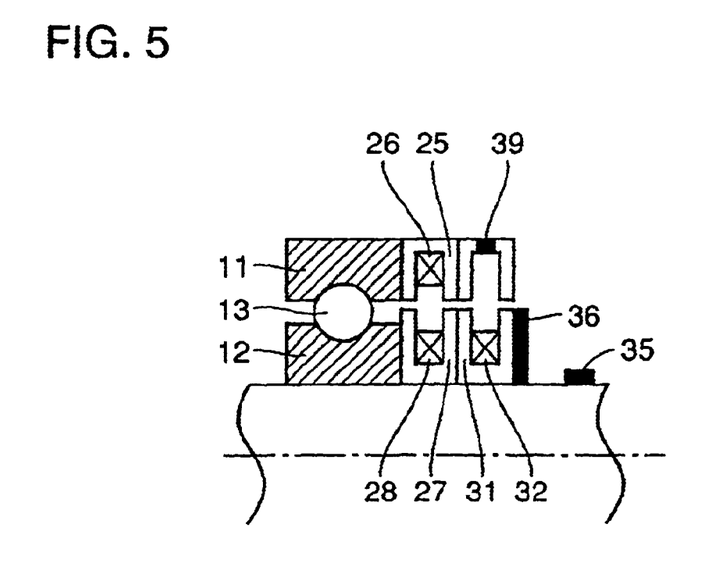

FIG. 5 shows still another embodiment of the present invention based on the principle of FIG. 1. The embodiment of FIG. 5 has a Hall IC 39 provided instead of reception coil 34 of FIG. 3. Hall IC 39 detects the change in the magnetic field from transmission coil 32 based on the output of sensor 35, whereby a detection signal of sensor 35 is output. The usage of such a Hall IC allows simplification of the structure of the receiving waveform processing circuit.

Figure 6:
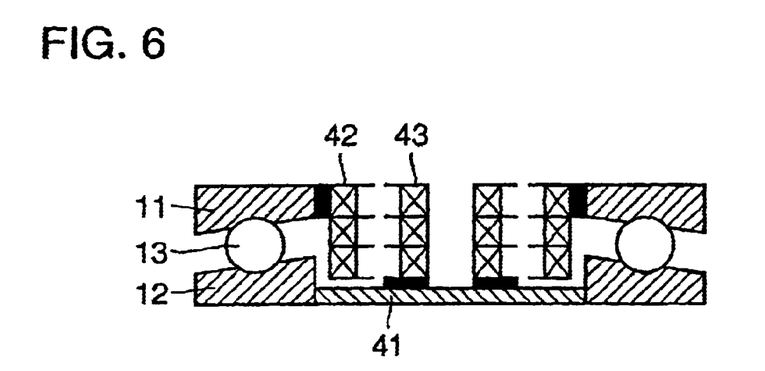
FIG. 6 is a sectional view showing another embodiment of the present invention based on the principle of FIG. 1.

FIG. 6 shows a still further embodiment of the present invention based on the principle of FIG. 1. Referring to FIG. 6, a spacer 41 is provided across the bore of inner ring 12. Yokes 42 and 43 facing each other in the radial direction are provided between outer ring 11 and spacer 41. Yoke 42 is fixed to outer ring 11 whereas yoke 43 is fixed to spacer 41. A power feed coil or reception coil shown in FIG. 3 is wound around yoke 42. A power receiving coil or transmission coil is wound around yoke 43. The rotation of inner ring 12 causes a magnetic loop to be formed between yokes 42 and 43, whereby power transfer from each coil or signal transfer is carried out.

By altering the facing direction of yokes from the radial direction to the axial direction, the attachment of the coil to the yoke becomes easier. Also, the space between the two bearings of the combination bearing can be utilized effectively.

Figure 7:
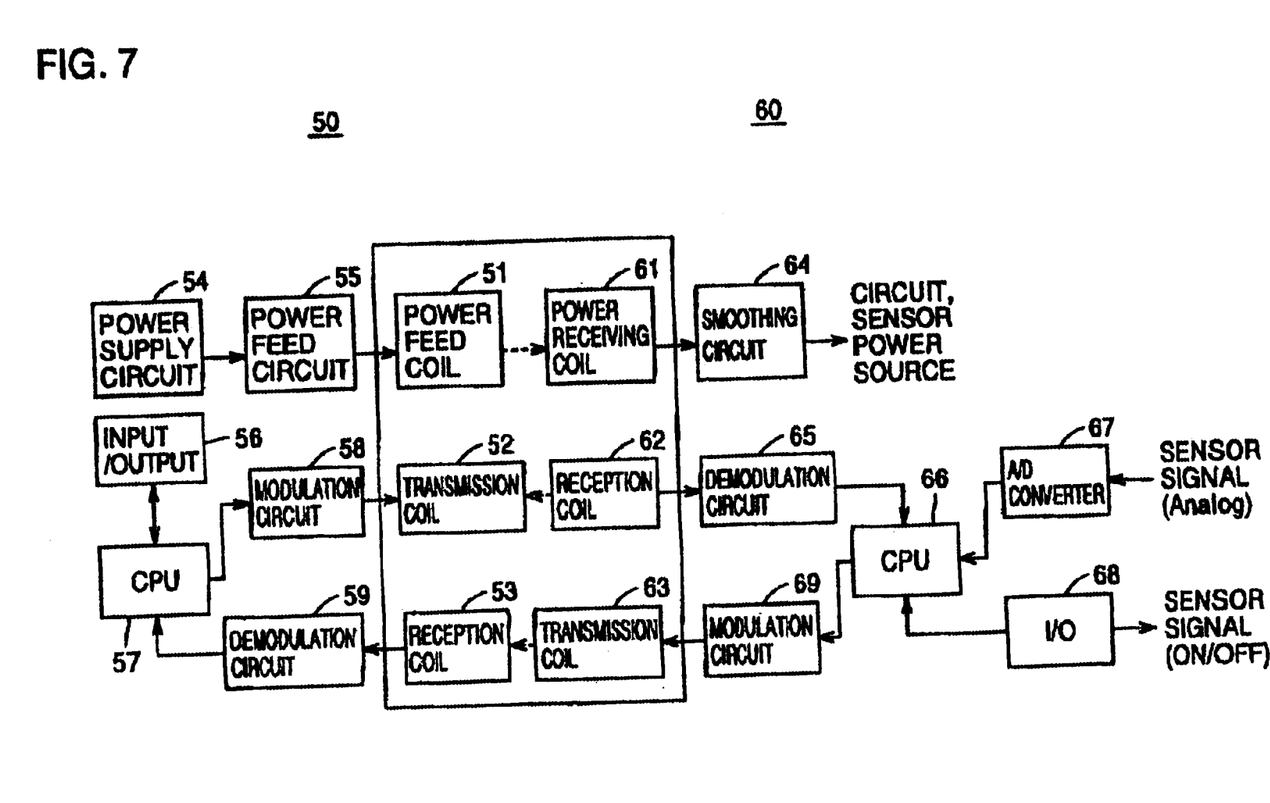
FIG. 7 is a block diagram of the electric structure of a bearing with a noncontact signal transfer mechanism of the present invention.

FIG. 7 is a block diagram of the electrical structure of the bearing with a noncontact signal transfer mechanism of the present invention. The present embodiment is directed to transmit/receive a signal by magnetic coupling of the stationary side and rotation side as shown in FIG. 3 to apply processing using a CPU.

A power feed coil 51, a transmission coil 52, and a reception coil 53 are provided at the outer ring of the stationary side 50. A power receiving coil 61, a reception coil 62, and a transmission coil 63 are provided at the inner ring of the rotating side 60. The DC voltage from a power supply circuit 54 is converted into AC voltage by a power feed circuit 55 to be applied to power feed coil 51. Power receiving coil 61 induces AC voltage from power feed coil 51. A smoothing circuit 64 rectifies that AC voltage to supply DC voltage to each circuit and sensor.

The analog signal of a sensor (not shown) provided at the rotary side 60 is converted into a digital signal by an A/D converter 67 to be applied to a CPU 66. The on/off signal of the sensor is supplied to CPU 66 via I/O 68. CPU 66 converts the detection signal from each sensor into a serial signal. A modulation circuit 69 modulates the pulse of the serial signal in a predetermined format. The modulated signal is provided to transmission coil 63.

Transmission coil 63 delivers the pulse-modulated signal to reception coil 53 as a change in the magnetic force. Reception coil 53 detects that magnetic force change. The pulse modulation signal is demodulated by a demodulation circuit 59 to be applied to a CPU 57. CPU 57 converts the serial detection signal from the sensor into a parallel signal. The parallel signal is provided to an input/output unit 56. Input/output unit 56 is formed of a keyboard, a display device, a printer, or the like. The sensor output is provided on the display device or printed out by a printer. Also, input/output unit 56 can be directly interfaced with another controller such as a sequencer or a measurement device.

When information is to be transferred from the stationary side 50 to the rotary side 60, the signal input through the keyboard of input/output unit 56 is applied to CPU 57 to be converted into a serial signal and pulse-modulated by modulation circuit 58. The modulation signal is transferred to reception coil 62 by transmission coil 52 as a change in the magnetic field. A demodulation circuit 65 demodulates the pulse-modulated signal. The demodulated signal is applied to CPU 66.

According to the embodiment of FIG. 7, power can be fed from stationary side 50 to rotary side 60 in a noncontact manner without using a contact type brush and slip ring. Also, a sensor output can be transmitted from the rotary side 60 to the stationary side 50. Furthermore, a control signal can be transferred from the stationary side 50 to the rotary side 60.

Figure 8:
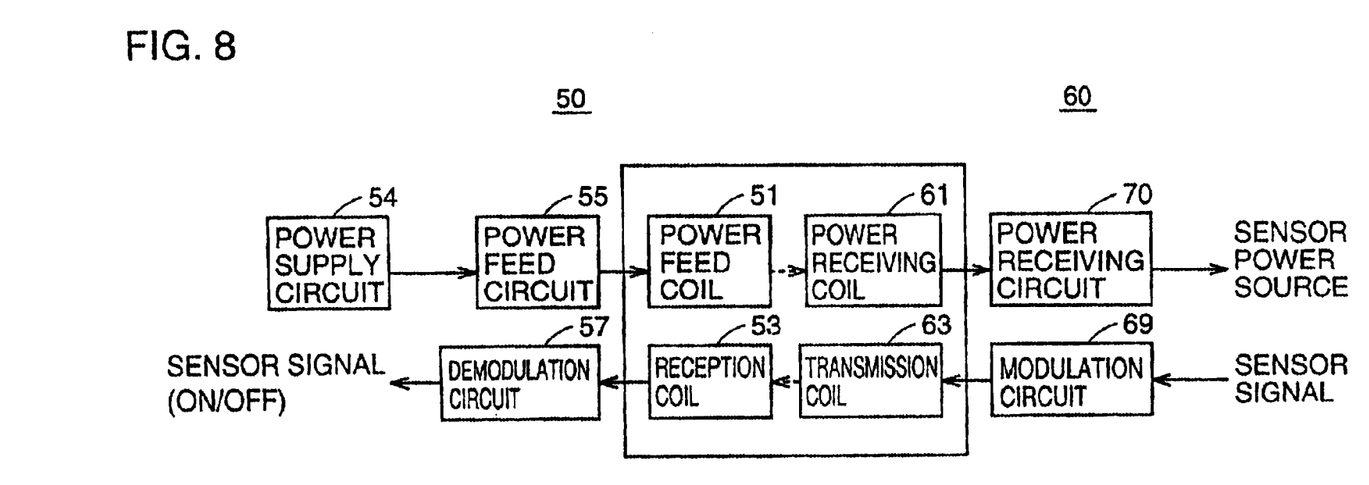
FIG. 8 is a block diagram showing a structure of a transfer mechanism with magnetic coupling for transmission/reception, transferring a signal without using a CPU.

FIG. 8 is a block diagram showing a structure of the transfer mechanism by the magnetic coupling of transmission/reception and transferring a signal without using a CPU. This embodiment is applicable to the case where a simple on/off sensor signal is transmitted from the rotary side 60 to the stationary side 50. The scheme of FIG. 3 is applied to the mechanical structure.

The DC voltage from power supply circuit 54 is converted into AC voltage by power feed circuit 55. The AC voltage is applied to power feed coil 51. A magnetic force is generated from power feed coil 51. Power receiving coil 61 induces AC voltage based on the magnetic force from power feed coil 51. A sensor power source is supplied by power receiving circuit 70 to the sensor.

The on/off signal from the sensor is pulse-modulated by modulation circuit 69. The sensor output is transmitted from transmission coil 63 to reception coil 53 as a change in the magnetic force. The pulse modulation signal is demodulated by demodulation circuit 57. The on/off sensor signal is output.

Figure 9:
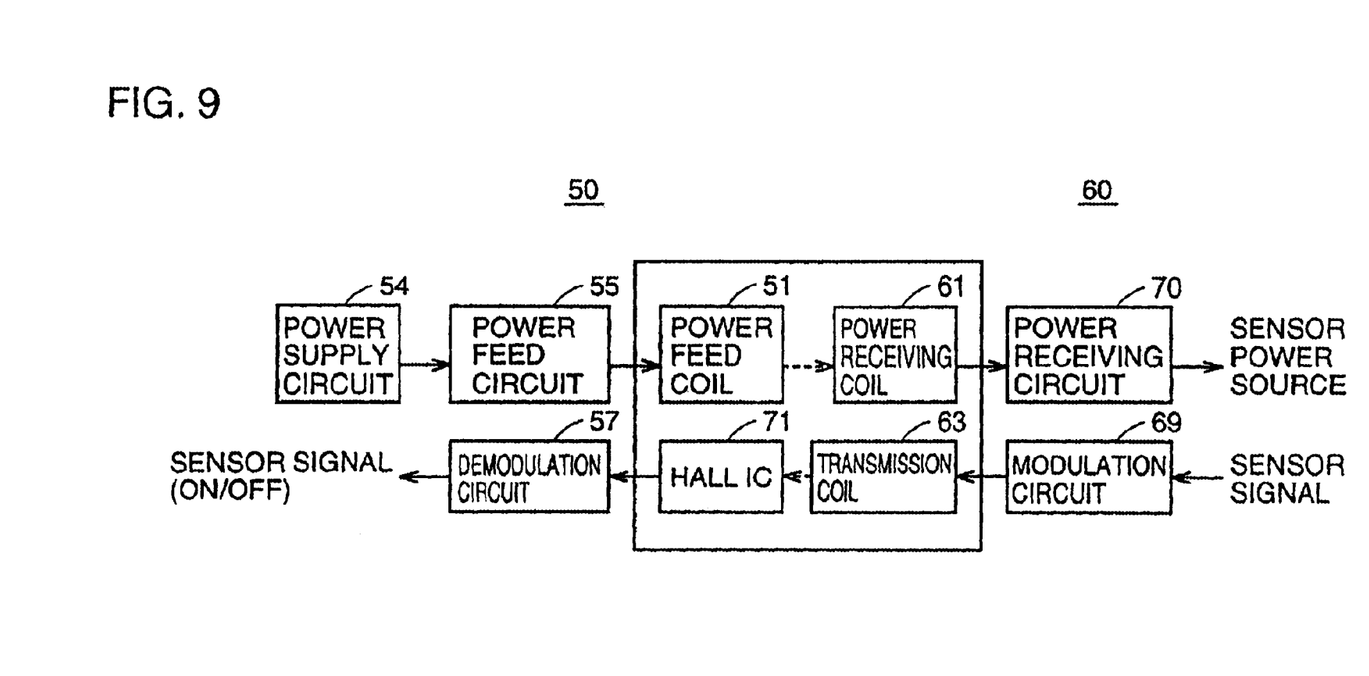
FIG. 9 is a block diagram of an embodiment of magnetic coupling by a Hall IC.

FIG. 9 is a block diagram of the embodiment of magnetic coupling by a Hall IC, based on the structure of FIG. 5. In FIG. 9, a Hall IC 71 is provided instead of reception coil 53 of FIG. 8. Hall IC 71 detects the change in the magnetic force of transmission coil 63. The remaining operation is identical to that of FIG. 8.

Figure 10:
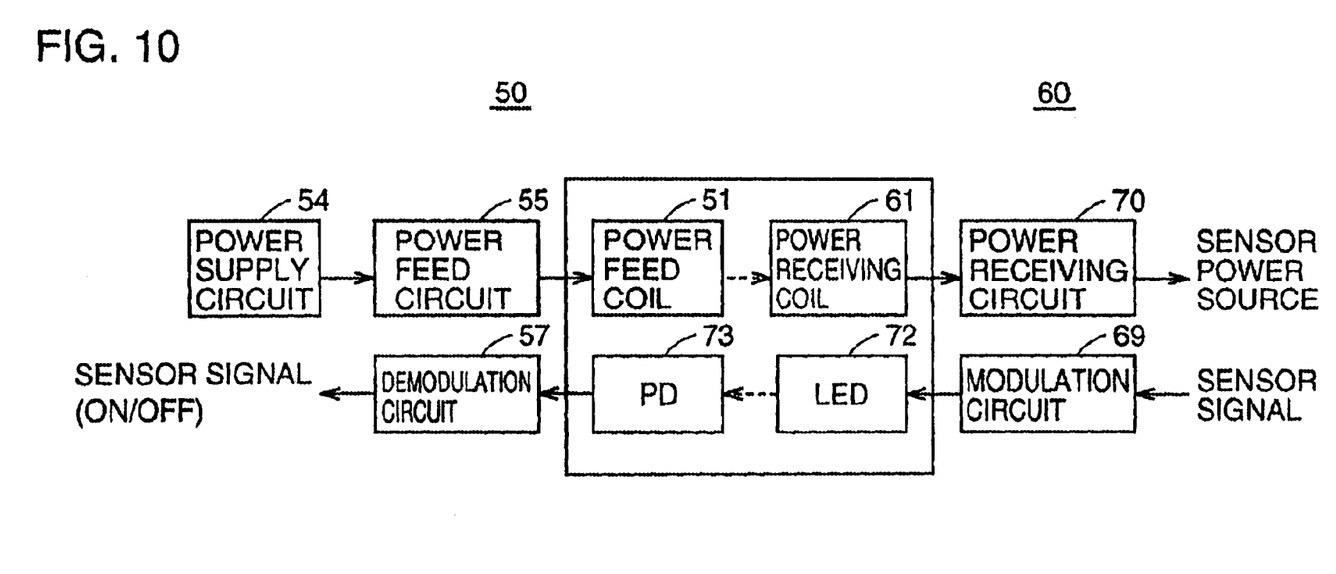
FIG. 10 is a block diagram of an embodiment for transmission/reception through optical coupling.

FIG. 10 is a block diagram of the embodiment for transmission/reception by optical coupling. The embodiment of FIG. 10 has an LED 72 provided instead of transmission coil 63 of FIG. 8 and a PD 73 provided instead of reception coil 53. Modulation circuit 69 pulse-modulates the sensor signal. LED 72 attains a blinking state. PD 73 receives the flashing light. Demodulation circuit 57 demodulates the sensor output signal.

Figure 11:
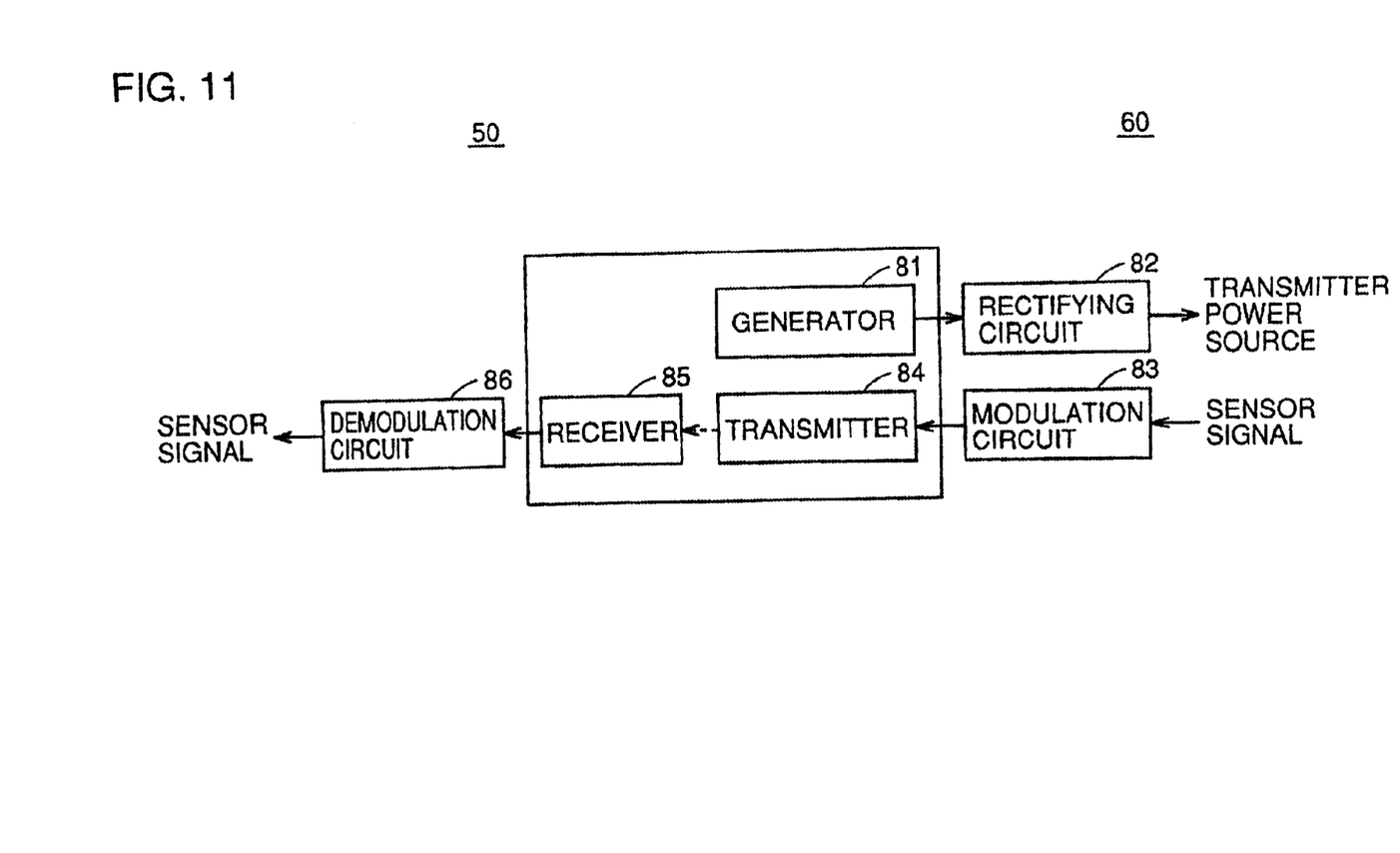
FIG. 11 is a block diagram of an embodiment transmitting/receiving the output of a sensor through radio.

FIG. 11 is a block diagram showing an embodiment to transmit/receive a sensor output through radio, corresponding to the structure shown in FIGS. 2A–2C.

Referring to FIG. 11, a generator 81 generates AC voltage by ring magnet 14 and generator coil 16 shown in FIG. 2C. A rectifying circuit 82 rectifies the AC voltage to output DC voltage, which is the transmitter power source.

The sensor signal is demodulated by a modulation circuit 83 to be transmitted by a transmitter 84 through a weak wave. The signal is received by a receiver 85 and demodulated by a demodulation circuit 86.

According to respective embodiments of the present invention described above, power can be supplied from the stationary side 50 to the rotary side 60 in a noncontact manner. The sensor output signal or the like of rotary side 60 can be transferred in a noncontact manner through electromagnetic coupling, optical coupling or radio.

Accordingly, the signal transfer means of the present invention is independent of wear, noise generation and attachment accuracy, as compared to the conventional signal transfer means corresponding to mechanical contact such as the contact type brush and slip ring.

Although the present invention has been described and illustrated in detail, it is clearly understood that the same is by way of illustration and example only and is not to be taken by way of limitation, the spirit and scope of the present invention.

What is claimed is:

1. A bearing with a noncontact signal transfer mechanism transmitting a signal from a rotary shaft to a fixed shaft, comprising:

a power generation circuit generating power between said rotary shaft and said fixed shaft, said power generation circuit comprising a power feed coil wound around a yoke provided at said fixed shaft, and a power receiving coil wound around a yoke provided at said rotary shaft, wherein a magnetic path is formed between the yoke of said fixed shaft and the yoke of said rotary shaft to provide a current flow to said power receiving coil, a signal transfer circuit configured to be responsive to the power generated by said power generation circuit to transfer a signal from said rotary shaft to said fixed shaft, a power supply circuit for supplying an alternating current to said power feed coil, and a power receiving circuit for receiving said alternating current through said vower receiving coil to rectify the received current for a sensor, wherein said signal transfer circuit comprises a transmission circuit provided at said rotary shaft to transmit a signal by radio waves, and a reception circuit provided at said fixed shaft to receive a signal transmitted from said transmission circuit.

* * * * *